Patented Jan. 16, 1923.

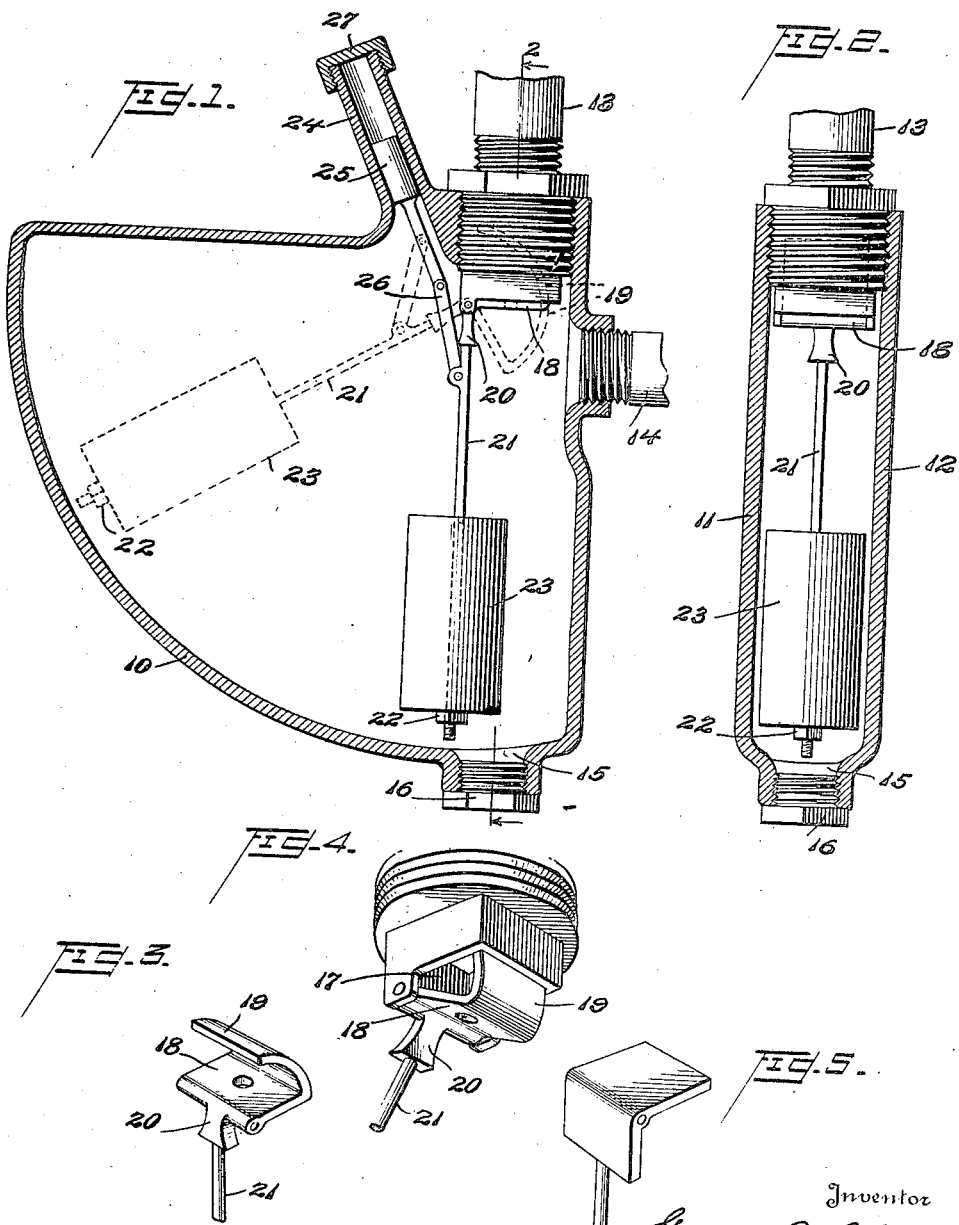

1,442,516

UNITED STATES PATENT OFFICE.

GEORGE A. BLAKE, OF NEW BEDFORD, MASSACHUSETTS.

VALVE FOR CONTROLLING THE FLOW OF FLUIDS.

Application filed March 9, 1920. Serial No. 364,439.

*To all whom it may concern:*

Be it known that I, GEORGE A. BLAKE, a citizen of the United States, and residing at New Bedford, Bristol County, State of Massachusetts, have invented certain new and useful Improvements in Valves for Controlling the Flow of Fluids, of which the following is a specification.

The object of the invention is to provide a valve for controlling the flow of fluids, as for instance water, from a supply main into a distributing system. The invention is particularly useful in urban communities where the water in the mains of the supply system is under high pressure, as in in such cases the pressure is communicated to the various house distributing systems and the opening of a faucet results in a rapid flow of water under an objectionably high pressure, the quantity supplied in a given time being not only too great but considerable splashing being the result of the high pressure. By interposing between the supply main and the distributing system a valve made in accordance with this invention, the pressure in the distributing system and the flow from the faucets may be regulated as desired.

The invention will be fully disclosed in the following description when taken in connection with the accompanying drawings, in which Fig. 1 is a longitudinal section through the valve casing;

Fig. 2 is a section along line 2—2 of Figure 1;

Figure 3 is an enlarged perspective view of the valve proper;

Fig. 4 is a perspective view of the outlet port showing the valve in partly open position, as viewed from below; and Fig. 5 is a similar view of a modified form of valve.

The valve casing 10 is preferably of metal and has parallel side walls, 11 and 12 of sector shape, these side walls being connected at their edges by short end walls. The top of the casing is provided with an inlet opening to which is connected the inlet pipe 13 and adjacent this inlet opening is an outlet opening to which is connected the outlet pipe 14. At the bottom of the casing is located a clean out opening 15 which is capped by a threaded cap 16.

The inlet pipe 13 terminates in a squared portion having in its end a rectangular port 17. In this port 17 is arranged a valve V, pivoted horizontally at one edge of the port. The valve V has a normally horizontal main portion 18 and a curved wing 19 extending upwardly from its free edge. It is also provided with a downwardly extending projection 20. The valve V does not positively seat in the port 17 and does not make an absolutely fluid tight joint with its edges, as this is not desired, in fact a small opening is made in the portion 18 for the passage of fluid when the valve is closed, so that variations of pressure on opposite sides may be readily equalized. The curved wing 19 is provided for the purpose of directing the stream of water issuing from port 17 against the main portion of the valve when it is open, as in Figures 1 and 4, so that the entire pressure of the water is exerted to maintain the valve in open position when a flow is in progress.

To member 20 is connected a lever 21 screw threaded at its lower end to receive a threaded nut 22 which is adjustable therealong and which supports the cylindrical weight 23. A tube or cylinder 24 extending from and preferably integral with the upper wall of the casing, contains a plunger 25 which is connected by means of a pivoted link 26 to the lever 21. This plunger 25 makes a sliding fit with the inner wall of the extension 24, but not a fluid tight fit so that as the plunger is moved longitudinally in its containing tube 24, fluid may pass along its sides from one end to the other, the cap 27 preventing the escape of fluid from the upper end of the extension 24. The plunger and its containing sleeve therefore act as a dash pot mechanism when fluid is present in the casing.

When the pipe 13 is connected to a high pressure main and the pipe 14 to a house distributing system, it will be seen that so long as the house spigots or faucets remain closed that the pressure on each side of the valve V will remain the same, but that when a faucet is open the pressure on the outlet side of the valve will fall below that on the inlet side of the valve. This causes the valve to open to admit water into the valve casing 10 and into the house distributing system, to replace that escaping. The weight 23 opposes the opening movement of the valve inasmuch as the lever 21 is rigidly connected to the pivoted valve and the latter can not rotate about the pivotal axis without moving the lever and weight. The effect of the weight therefore is to cause the valve to exert a back pressure against the fluid in the mains and to prevent the high pressure in the supply pipes from being communicated to the house distributing system, after a faucet has been opened. As additional faucets are opened and more water is required the weight is further rotated about the pivotal axis of the valve, to occupy a position such as illustrated in dotted lines in Figure 1. It can be seen that the back pressure exerted by the valve under the influence of the weight increases as the demand on the distributing system is increased.

In practice the weight is so adjusted that when all of the outlets of the house distributing system are open and delivering water, the pressure is such that the flow is neither too fast nor too slow. This is obtained by adjusting the position of weight 23 on the valve stem to give this desired effect.

The dash pot arrangement retards the movement of the valve in opening and closing so that the latter does not move too rapidly or oscillate under slight variations in the water pressure. The dampening movement of the dash pot is aided by the retarding effect of the water upon the weight 23 which fits quite closely between the side walls 11 and 12 of the casing. As the weight 23 swings about the axis of the valve, the water displaced must pass around its end.

From the above description it will be apparent that the valve will equalize the distribution of the water by regulating its pressure in the distributing system, as soon as one of the faucets of the distributing system is opened. The valve, as stated before, does not seat positively, but is held in closed position by means of the weight which falls to lowermost position due to force of gravity. Furthermore while I have described the valve as applied to water circulation systems, it will be understood that it might be applied to fluid distribution systems of other characters as, for instance, in gas distributing or steam distributing systems. It will also be obvious that changes may be made in the form and arrangement of the component parts of the invention, and I do not limit myself, therefore, to the exact form shown and described.

Having thus described the invention what is claimed as new and desired to be secured by Letters Patent is:

1. A liquid flow controlling device of the class described, comprising in combination, a casing having an inlet opening and an outlet opening, the outlet opening being adjacent the top of the casing so that a body of liquid will be trapped within the casing, a valve for closing the inlet port, and means for normally holding the valve in closed position and resisting the opening thereof including a weight connected to the valve and submerged in the liquid held by the casing, the movements of the weight being thereby retarded.

2. A liquid flow controlling device of the class described, comprising in combination, a casing having an inlet opening and an outlet opening, the outlet opening being adjacent the top of the casing so that a body of liquid will be trapped within the casing, a valve for closing the inlet port, and means for normally holding the valve in closed position and resisting the opening thereof including a weight connected to the valve and fitting closely within the walls of the casing, said weight being submerged in the liquid held in the casing, the movements of the weight being thereby retarded.

3. A liquid flow controlling device of the class described, comprising in combination, a casing having an inlet opening and an outlet opening, the outlet opening being adjacent the top of the casing so that a body of liquid will be trapped within the casing, a valve for closing the inlet port and means for holding the valve in closed position and resisting the opening thereof including a weight adjustably secured to the valve and submerged in the liquid held by the casing whereby the resistance to the movement of the valve may be closely regulated.

4. A liquid flow controlling device of the class described, comprising in combination, a casing having an inlet opening and an outlet opening and so constructed that a body of liquid will be trapped therein, a valve for closing the inlet port, and means for holding the valve in closed position and resisting the opening thereof, including a weight connected to the valve and submerged in the liquid held by the casing, the movement of the weight being thereby retarded.

In testimony whereof I affix my signature.

GEORGE A. BLAKE.